July 29, 1930.  T. COLLITO  1,771,772
FLUSH VALVE
Filed Feb. 8, 1928   2 Sheets-Sheet 1

INVENTOR.
Thomas Collito
BY Harry Cohen
ATTORNEY.

July 29, 1930.  T. COLLITO  1,771,772
FLUSH VALVE
Filed Feb. 8, 1928   2 Sheets-Sheet 2

INVENTOR.
Thomas Collito
BY Harry Cohen
ATTORNEY.

Patented July 29, 1930

1,771,772

UNITED STATES PATENT OFFICE

THOMAS COLLITO, OF NEWARK, NEW JERSEY

FLUSH VALVE

Application filed February 8, 1928. Serial No. 252,851.

The present invention relates to flush valves.

One of the objects of the invention is to simplify the construction of valves of this type, and more specifically, to simplify the construction of the plunger by reducing the number of parts thereof.

Another object is to improve the reliability of operation of valves of this character.

A further object of the invention is generally to improve the construction and operations of flush valves.

In the accompanying drawings, forming a part of this specification, there is shown the preferred embodiment of the invention.

Figure 1:
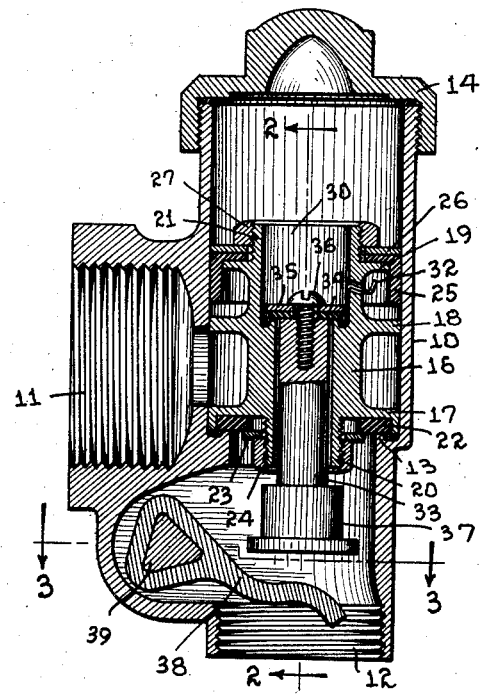
Fig. 1 is a central longitudinal section of the flush valve.
Figure 2:
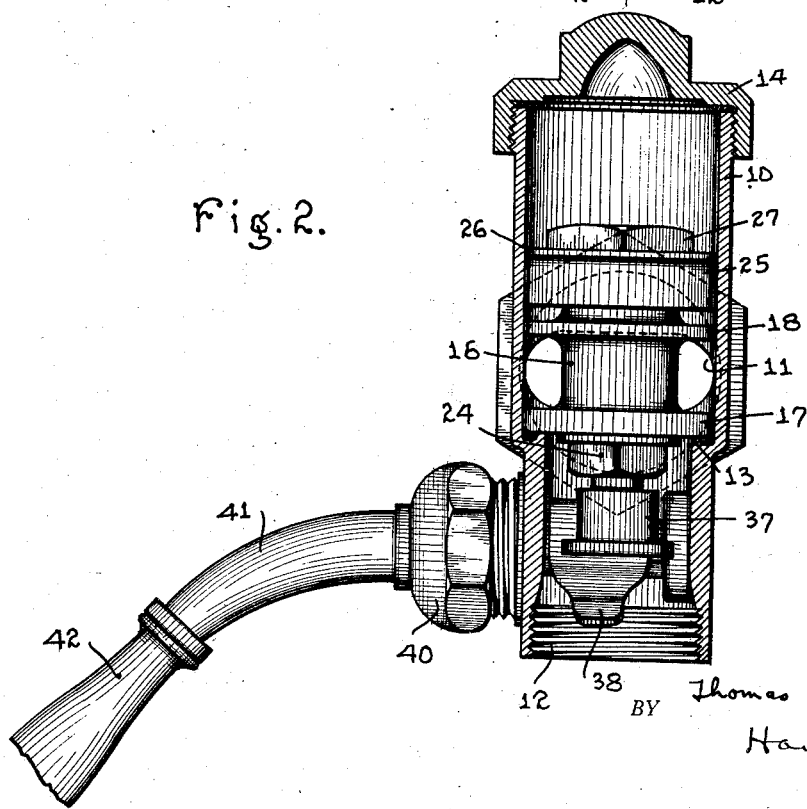
Fig. 2 is a sectional view on the line 2—2 of Fig. 1.
Figure 3:
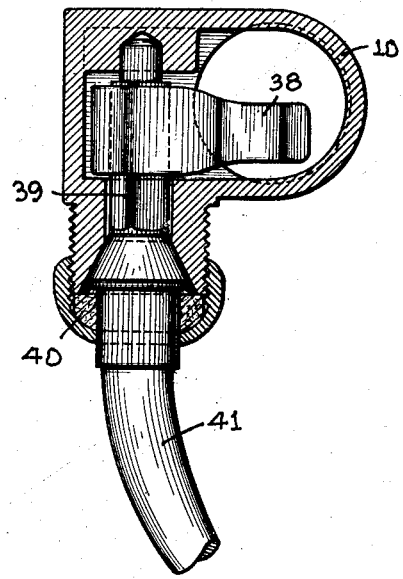
Fig. 3 is a sectional view on the line 3—3 of Fig. 1.

The valve casing 10 has a threaded inlet passage 11, a threaded outlet passage 12, and, intermediate these passages, a valve seat 13. A cap 14 closes the valve casing 10. The valve or plunger 15 is slidably positioned within the casing 10 and cooperates with the valve seat 13.

Figure 4:
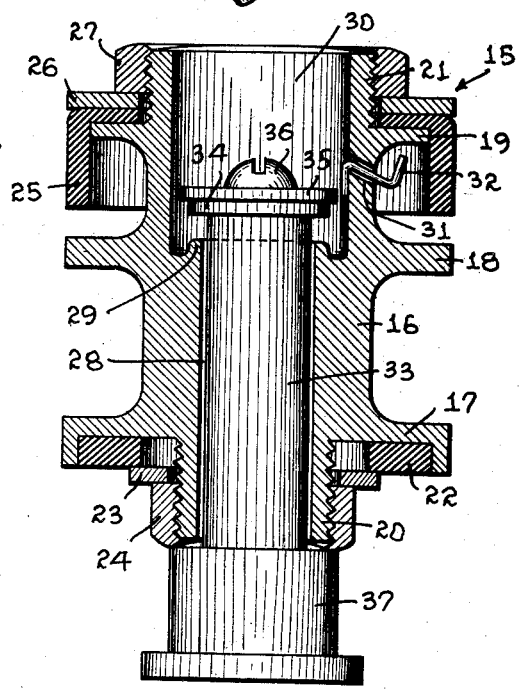
Fig. 4 is a view, partly in elevation and partly in section of the main valve or plunger, and the relief valve shown in open position.

The plunger 15, shown more clearly in Fig. 4, comprises a tubular member 16 having two spaced circular piston members 17 and 18 of equal diameter, and an upper piston member 19 of a smaller diameter. The ends of the tubular member are threaded as at 20 and 21. The lower piston section 17 has a recess within which is a resilient washer 22, held in position by a metal washer 23 and a nut 24. A cup washer 25 is held on the piston member 19 by a metal washer 26 and a nut 27. The tubular member 16 has a bore 28, terminating at its upper end in a valve seat 29, and a bore 30 of increased size. A by-pass opening 31 is formed in the wall of the plunger 15 above the valve seat 29 and a wire 32 is loosely mounted for movement therein to keep the by-pass from clogging.

A slight clearance, sufficient to permit the passage of water, is provided between the piston members 17 and 18 and the internal wall of the casing 10. The cup washer 25 serves as a packing and prevents the passage of water between the outside of the plunger above the piston member 18 and the casing wall.

A relief valve body 33 is loosely mounted for movement within the bores 28 and 30 of the plunger 15. The valve body 33 has at its upper end a valve face which may comprise a resilient washer 34 for engaging the relief valve seat 29. The washer 34 is held in place by a metal washer 35 and a screw 36, threaded into the valve body 33. The lower end of the valve body 33 is provided with an enlargement 37 to limit the upward movement thereof in the bore 28 of the plunger 15.

An actuating lever 38 is adapted to engage the bottom of the valve body 37 whereby to lift the relief valve away from its seat and to lift the main valve or plunger away from its seat. The lever 38 is mounted on a spindle 39 journaled in the lower portion of the casing 10 and extending at one end through a packing gland 40. The spindle 39 is bent externally of the casing 10, as at 41, to provide a crank or mechanical advantage for the turning thereof, and has a handle 42 at its end.

As will be readily understood, in use the inlet passage 11 will be connected to the water supply pipe and the outlet passage 12 will be connected to the flush pipe of the water closet or urinal. Normally, the valve 15 is seated on the valve seat 13 shutting off the flow of water therethrough. The pressure of the water passed between the piston members 17 and 18 and the casing wall and through the by-pass 31 acts on the piston section 19 and the relief valve 34 holds the main valve 15 and the relief valve 34 to their respective seats. When it is desired to actuate the flush valve, the lever 38 is caused to engage the valve body 33. During the first part of the movement of the lever 38, the relief valve 34 is unseated permitting water to flow from above the plunger 15, through the bore 28 thereof, thereby facilitating upward movement of the plunger 15 during the subsequent movement of the lever 38 when the latter lifts the section 37 into engagement with the lower end of the plunger 15 and raises the latter away from the valve seat 13. Water then flows from the inlet 11 through the casing and the outlet 12 thereof. As the handle of the lever is released as soon as the valve 15 is lifted, the return of the latter then takes place. The lever 38 dropping away from engagement with the valve body 33 permits the relief valve 34 to seat whereby to close the passage through the bore in the valve 15, thereby to shut off the flow of water therethrough. Water then accumulates in the space above the valve 15 and acts on the upper exposed surface to force the valve 15 to its seat 13 and thereby to shut off the passage of water through the valve casing. The flow of water through by-pass 31 serves to move the wire 32 whereby to prevent the accumulation of foreign particles in the by-pass.

The construction of the flush valve thus described is highly advantageous more especially because of the simplified construction of the plunger and relief valve. Aside from the washers and the means to hold them in place, the plunger has but one part which may be very easily produced. Similarly, the relief valve body has only one part. This simplified construction not only facilitates the manufacture of the valve but also results in improved operation, for, by reason of the reduction in the number of parts, the valve is less likely to get out of order.

While I have shown the preferred embodiment of the invention, it is to be understood that certain changes in the construction and arrangement of parts may be made without departing from the invention as set forth in the appended claims.

Having thus described my invention, what I desire to claim and secure by Letters Patent is:

1. A flush valve adapted to permit a flow of water from a supply pipe to a closet-bowl comprising a casing having an inlet, an outlet, and a valve seat therebetween, and a valve cooperating with said seat to control the passage of water from said inlet to said outlet having a plunger comprising a tubular body having, at one end thereof, a washer for engaging the valve seat of the casing, and, at the other end thereof, a packing, a relief valve seat within and between the ends of said plunger integral therewith, a relief valve mounted in said plunger cooperating with said relief valve seat, a by-pass in said plunger above said relief valve and below said packing, and means for actuating said relief valve and for positively moving said first-mentioned valve away from the valve seat of the casing, comprising a rotatable handle having a lever attached thereto normally spaced from and adapted to engage said relief valve.

2. A flush valve adapted to permit a flow of water from a supply pipe to a closet-bowl comprising a casing having an inlet, an outlet, and a valve seat therebetween, and a main valve cooperating with said seat to control the passage of water through the casing comprising a tubular plunger having two spaced balanced piston members, one of said members having a valve face for engaging the valve seat of the casing, and a piston member having a packing, a by-pass around said packing, a relief valve, and means for opening said relief valve and said main valve comprising a rotatable handle having a lever attached thereto spaced from and adapted to engage said relief valve.

In testimony whereof I hereunto affix my signature.

THOMAS COLLITO.